Patented July 16, 1929.

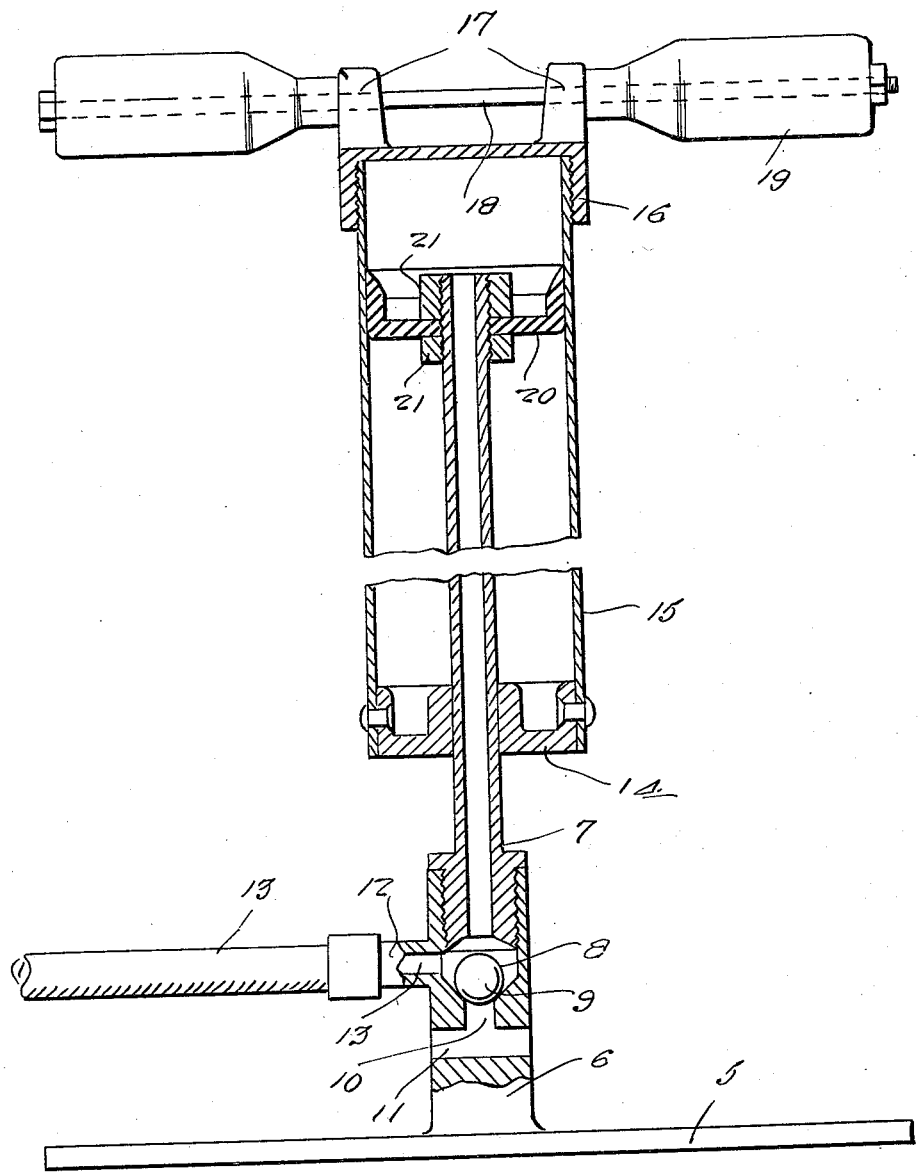

1,721,127

UNITED STATES PATENT OFFICE.

MARCINE CLINE LILLY, OF DECATUR, ILLINOIS.

PUMP.

Application filed May 22, 1928. Serial No. 279,716.

The present invention relates to pumps and comprises essentially an air pump adapted particularly for pumping air into vehicle tires and has for its principal object to provide a novel pump structure in which the cylinder of the pump is fixedly attached for movement with the operating handle and arranging a tubular stem within the cylinder to which is fixedly attached a piston slidably disposed within the cylinder whereby to force the air through the stem.

A further object of the invention is to provide a device of this character of a simple and practical construction which is efficient and reliable in performance, relatively inexpensive to manufacture, and assembled in operative position and otherwise adapted for the purposes for which the same is intended.

Other objects of the invention will become apparent as the nature of the invention proceeds, and when taken in connection with the accompanying drawing.

In the drawings:

The figure is a vertical sectional view through the pump and the supporting base therefor.

Referring now to the drawing in detail, wherein for the purpose of illustration I have disclosed a preferred embodiment of my invention, the numeral 5 indicates a supporting base, 5, which may be of any suitable formation, and upon which the feet of the operator may be placed for securing the pump upon the ground, the upper portion of the base having a standard 6 extending therefrom, the upper end of the standard being hollow and open at its upper end, said upper end being internally threaded and adapted to receive the lower end of the stem 7. The stem 7 is hollow throughout its length and its lower end opens into a valve housing 8, formed within the standard and within which is arranged a ball valve 9, adapted to control the downwardly extending air passage 10, communicating with laterally extending air intake ports 11, opening through the opposite sides of the standard. From one side of the standard 6 extends a tubular boss 12, also having a passage 13, formed therein and communicating with the chamber 8 of the passage 10. To the outer end of the board 12 is attached an air hose 13 of the type generally provided for attachment to a vehicle tire. The stem 7 extends upwardly through an opening formed in a plug 14, secured in the lower end of a pump cylinder 15, the upper end of the cylinder being open and provided with a threaded cap 16, upon the upper portion of which is formed a pair of spaced ears 17 having openings formed therein and through which is inserted a handle rod 18, outwardly from each side of the cap and to the opposite ends of which is secured handle grips 19.

The upper end of the stem 7 disposed within the cylinder carried a piston head 20, preferably in the form of a leather washer snugly fitted within the cylinder and secured in position to the upper end of the stem by nuts 21 on the stem at each side of the washer. It will thus be apparent that upon the upward movement of the handle 19 and the cylinder 15 will be moved upwardly on the stem until the suction created above the piston head within the cylinder, the ball valve 9 will be unseated from the intake passage 10 and permit air to enter the upper portion of the cylinder to the stem 7.

Upon the downward stroke of the handle, the piston head 20 will operate to force the air from the cylinder downwardly through the stem and out through the hose 13 so as to cause inflation of the tire. It is obvious that the invention is susceptible of various changes and modifications, without departing from the spirit or scope of the invention or sacrificing any of its advantages and I accordingly claim all such forms of the device to which I am entitled.

Having thus described my invention, what I claim as new is:

1. A pump comprising a base, a standard extending upwardly therefrom, said standard being hollow at its upper end, an air intake port communicating with the hollow portion of the standard, a check valve for said air intake port, a discharge passage communicating with the hollow portion of the standard above said check valve, a tubular stem threadedly attached to the upper portion of said standard, a cylinder slidably mounted for vertical movement upon said stem, and a piston head attached to the upper end of the stem within the cylinder and adapted upon opposite sliding movement of the cylinder to effect the intake and discharge of air therefrom.

2. A pump comprising a supporting base, a standard extending upwardly therefrom, said standard being hollow at its upper end, air intake and discharge ports communicating with the hollow portion of the standard, a check valve arranged within the standard controlling communication between the intake port thereof, a tubular stem threadedly attached to the upper portion of the standard, a pump cylinder slidably mounted on said stem, a piston head attached at the upper end of the stem, and disposed within the cylinder and cooperating with the cylinder during the movement thereof to actuate said check valve whereby to admit air into the cylinder during the upward movement of the cylinder, and to discharge the same therefrom upon the downward movement thereof, a cap threadedly attached at the upper end of the cylinder, and a handle secured to said cap.

3. A pump comprising a cylinder, a piston arranged for operation therein, a hollow stem for the piston communicating at its upper end with the interior of the cylinder, a hollow standard attached at the lower end of the stem and communicating therewith, said standard having intake and discharge ports therein, and a valve arranged to oppositely control said intake port upon reversedly operating the pump.

4. A pump comprising a cylinder, a piston arranged for operation therein, a hollow stem for the piston communicating at its upper end with the interior of the cylinder, a hollow standard attached at the lower end of the stem, said standard having intake and discharge ports therein, a valve chamber formed in said standard having communication with each of the ports and with the stem and an automatic valve arranged in the chamber adapted to control said intake port upon reversedly operating the pump.

In testimony whereof I affix my signature.

MARCINE CLINE LILLY.